United States Patent [19]

Sunaga et al.

[11] Patent Number: 5,908,154
[45] Date of Patent: Jun. 1, 1999

[54] AIR CONDITIONING APPARATUS IN AN AIR CONDITIONING SYSTEM FOR USE IN A VEHICLE

[75] Inventors: Hideki Sunaga; Masatoshi Suto, both of Tokyo, Japan

[73] Assignee: Calsonic Corporation, Tokyo, Japan

[21] Appl. No.: 08/946,356

[22] Filed: Oct. 7, 1997

[30] Foreign Application Priority Data

Oct. 7, 1996 [JP] Japan .................................. 8-265657

[51] Int. Cl.⁶ ....................................................... F24F 7/00
[52] U.S. Cl. ........................... 236/49.3; 165/204; 236/13
[58] Field of Search .............................. 236/51, 49.3, 13; 62/244, 180, 186, 203, 131; 165/203, 204, 42, 43, 202, 205; 454/75, 256, 258, 229

[56] References Cited

U.S. PATENT DOCUMENTS

| | | | |
|---|---|---|---|
| 4,358,050 | 11/1982 | Naganoma et al. | 236/13 |
| 4,941,326 | 7/1990 | Sumi et al. | 236/49.3 X |
| 5,293,928 | 3/1994 | Iida et al. | 165/204 |
| 5,547,125 | 8/1996 | Hennessee et al. | 236/49.3 |

*Primary Examiner*—Harry B. Tanner
*Attorney, Agent, or Firm*—Sughrue, Mion, Zinn, Macpeak & Seas, PLLC

[57] ABSTRACT

In the air conditioning apparatus, the air conditioning amplifier unit e is connected to the plurality of door actuators through a single communication line and a single power source line, and also there is provided a fan motor maximum voltage limit control means which not only can create a communication signal to be transmitted through the single communication line in the form of two-way signals including a transmission signal containing door target stop position data to be transmitted to the door actuators, and a response signal to be sent back from the door actuators, but also, when the door target stop position data transmitted last time is different from the door target stop position data transmitted this time, can exert a maximum voltage limit on a fan motor, and, when the signal to be sent back from the door actuators, to the air conditioning amplifier unit is a control end signal which indicates that the door position reaches the target position and the door control is ended, can remove the exertion of the maximum voltage limit.

4 Claims, 8 Drawing Sheets

FIG. 6 (a)
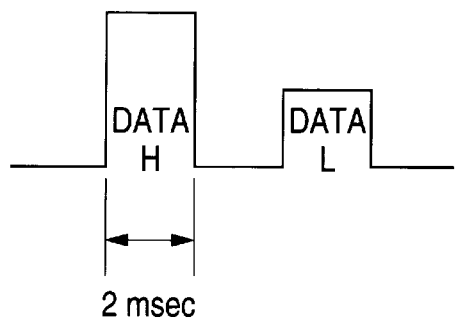
FIG. 6 (b)
| CODE | | WAVEFORM |
|---|---|---|
| HIGH ORDER bit | LOW ORDER bit | |
| SOM | | HLLL |
| 0 | 0 | HHH |
| 0 | 1 | HLH |
| 1 | 0 | HHL |
| 1 | 1 | HLL |
FIG. 7
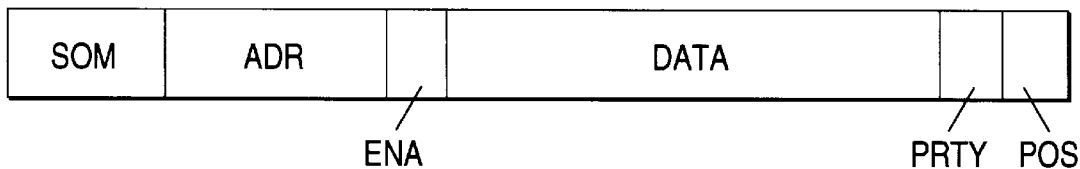

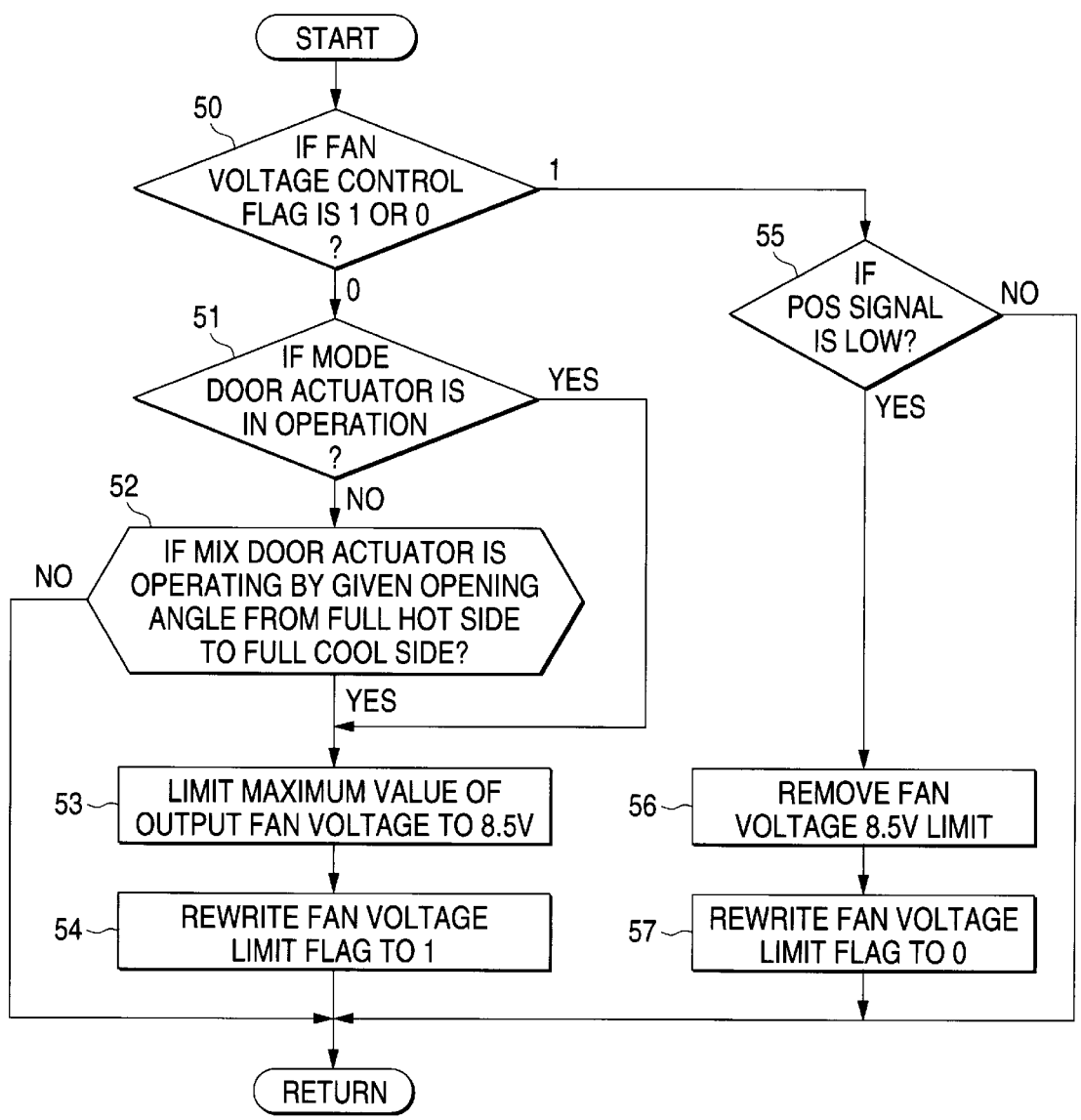

AIR CONDITIONING APPARATUS IN AN AIR CONDITIONING SYSTEM FOR USE IN A VEHICLE

BACKGROUND OF THE INVENTION

1. Field of the Invention

The present invention relates to air conditioning apparatus in an air conditioning system for use in a vehicle in which an air conditioning amplifier unit (a master station) is connected to one or more door actuators (slave stations) through a single communication line and a single power source line to provide an LAN (Local Area Network) system, thereby controlling the angle of opening of a plurality of doors.

2. Description of the Related Art

Conventionally, as air conditioning apparatus in an air conditioning system for use in a vehicle, for example, as disclosed in Japanese Patent Publication No. Hei. 6-8746, there is known air conditioning apparatus in which actuator drive circuits respectively for driving respective door actuators are incorporated into an air conditioning amplifier unit, and the actuators respectively for an air mix door, for a mode door, and for an intake door are connected to the drive circuits by harnesses.

However, in the above-mentioned conventional air conditioning apparatus in an air conditioning system for use in a vehicle, the drive circuits and their respective door actuators are connected together through five to nine harnesses, so that the number and weight of the harnesses are large. Also, the door actuators vary in type such as a potentiometer system, an encoder type, and the like, which makes it impossible to mass produce the door actuators. Further, since the actuator drive circuits are incorporated into the air conditioning amplifier unit, the amplifier becomes large in size and the load of the microcomputer also becomes large.

Here, as means for solving these problems, there is known a method in which an air conditioning amplifier unit is connected to a plurality of door actuators by a single communication line to thereby provide an LAN system.

That is, employment of the LAN system can reduce the number of harnesses used, can integrate the actuators, and can realize a compact amplifier, with the result that there can be provided excellent advantages, that is, the weight reduction of the system as well as the reduction of the system cost.

However, when employing the LAN system instead of the current system, there are still left the following problems to be solved.

In the current system, if the target value of a fan motor voltage is equal to or higher than 8.5 V during the operation of the mode door or during the full hot side operation of the air mix door in a bent mode, then the maximum voltage value of the fan motor voltage is limited to 8.5 V, that is, the maximum voltage of the fan motor to secure a torque used to operate the door is limited to this value.

However, when the LAN system is employed and thus the door opening angle data or the like are transmitted unilaterally from the amplifier through a single communication line to the actuators, it is impossible to judge, for example, whether the mode door is in operation or not and, therefore, even if the 8.5 V limit of the fan motor voltage is to be executed, the conditions for removal of the limits of the fan motor voltage cannot be detected and thus the fan motor voltage remains left at 8.5 V, which makes it inevitable to relinquish the 8.5 V limit.

SUMMARY OF THE INVENTION

Accordingly, it is an object of the invention to provide air conditioning apparatus in an air conditioning system for use in a vehicle adapted to drive and control a fan motor and a plurality of door actuators, which not only can reduce the weight of the air conditioning system and the cost of the system by arranging the amplifier and actuators in the form of an LAN system, but also can secure a door drive torque during the operation of a door by limiting the maximum voltage of the fan motor.

According to the present invention, as shown in FIG. 1, there is provided air conditioning control apparatus in an air conditioning system for use in a vehicle which comprises an air conditioning amplifier unit e for operating a built-in microcomputer to operate and process input signals from switches, sensors or the like according to a software program as well as for driving and controlling a fan motor a and a plurality of door actuators b, c and d respectively provided in the air conditioning system, and also which, when the target voltage of the fan motor becomes equal to or higher than the maximum voltage value while a door is in operation, limits the fan motor voltage to the maximum voltage value, wherein the air conditioning amplifier unit e is connected to the plurality of door actuators b, c and d through a single communication line f and a single power source line g, and a fan motor maximum voltage limit control means h not only can create a communication signal to be transmitted through the single communication line f in the form of two-way signals including a transmission signal containing door target stop position data to be transmitted to the door actuators b, c and d, and a response signal from the door actuators b, c and d, but also, when the door target stop position data transmitted last time is different from the door target stop position data transmitted this time, can exert the above-mentioned maximum voltage limit, and, when the signal to be sent back from the door actuators b, c and d, to the air conditioning amplifier unit e is a control end signal which indicates that the door position reaches the target position and thus the door control is ended, can remove the maximum voltage limit.

Further, in the air conditioning control apparatus according to the present invention, the above-mentioned fan motor maximum voltage control means h may be arranged as means for limiting the voltage of the fan motor to the maximum voltage value while a mode door is in operation or while the full hot side of an air mix door is in operation.

Still further, in air conditioning control apparatus according to the present invention, as the communication signal to be transmitted through the above-mentioned single communication line f, there may be used a ternary code including a clock signal supplied from the air conditioning amplifier unit e and data superimposed on the clock signal, two kinds of pulse amplitudes are used to express high and low states respectively, the final portion of the transmission signal is used as a response signal to be sent back from the door actuators b, c and d, and the response signal is structured such that two pulses are both high when the door control is under way, whereas a second one of the two pulses is low when the door control is ended.

BRIEF DESCRIPTION OF THE DRAWINGS

In the accompanying drawings:

FIG. 6 (a) is a view of a communication waveform, and FIG. 6 (b) is a view of an encoded table;

FIG. 7 is a view of a communication format for use in data communication;

FIG. 10 is a flow chart to show the flow of a fan motor maximum voltage limit control operation to be executed by an air conditioning amplifier unit.

DETAILED DESCRIPTION OF THE PREFERRED EMBODIMENTS

At first, description will be given below of the structure of an embodiment of the invention.

Figure 1:
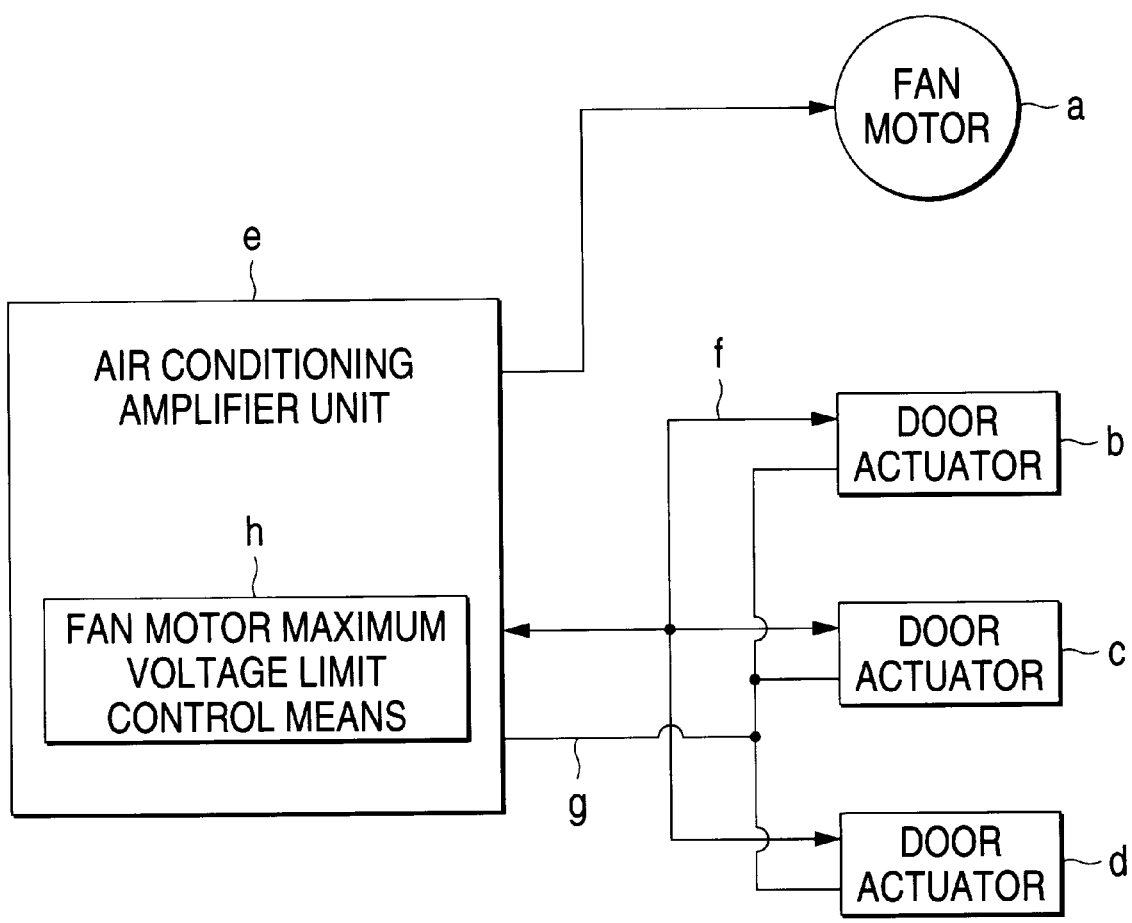
FIG. 1 is a block diagram of an air conditioning control apparatus in an air conditioning system for use in a vehicle according to the invention.
Figure 2:
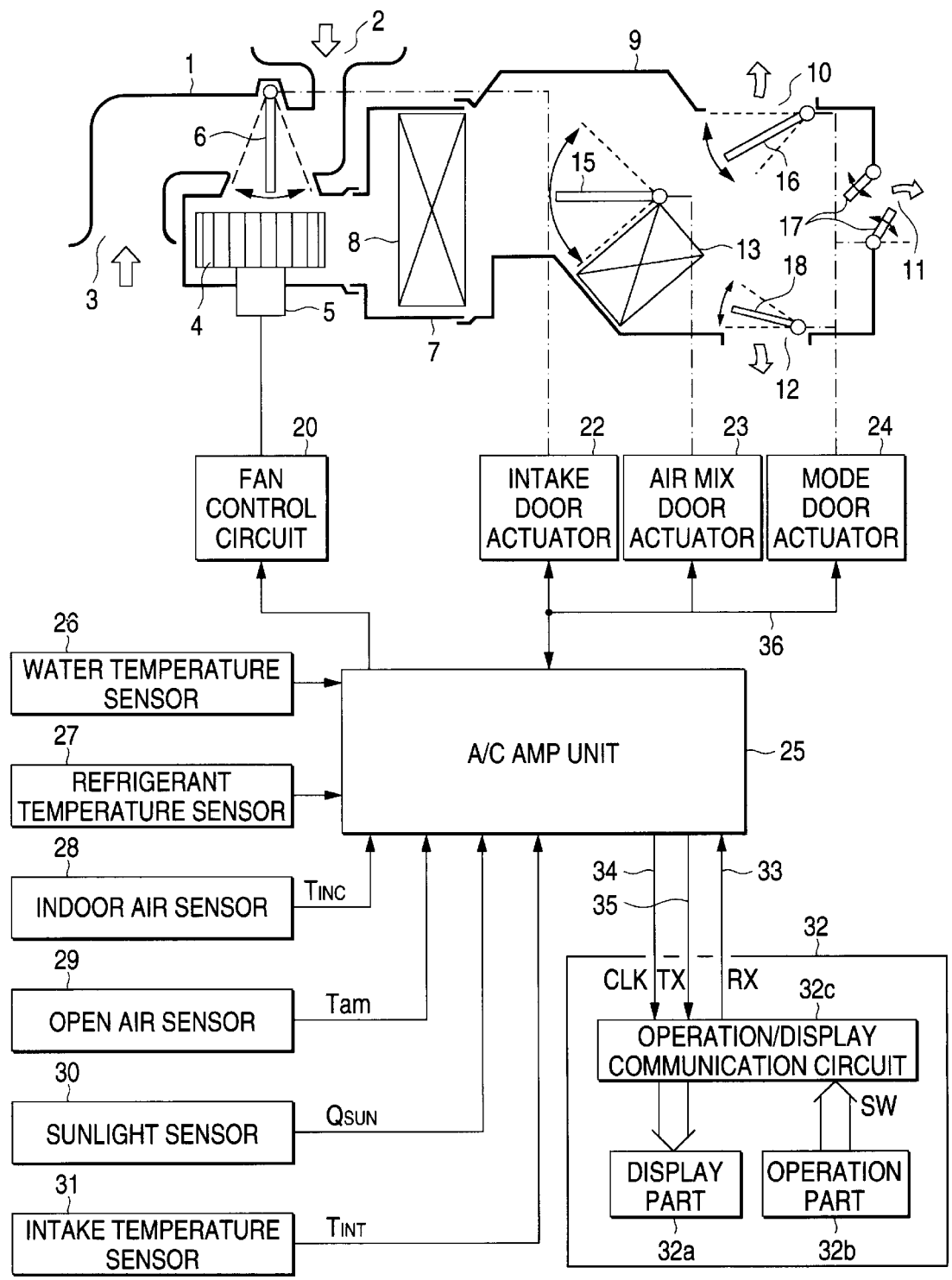
FIG. 2 is a general view of an air conditioning system for use in a vehicle to which an air conditioning control apparatus according to an embodiment of the invention is applied.

Now, FIG. 2 is a view of an air conditioning system for use in a vehicle to which the air conditioning control apparatus according to the embodiment of the invention is applied.

The present air conditioning system comprises a mechanical system which, as shown in the upper portion of FIG. 2, includes an intake unit case 1, an open air side intake port 2, an indoor side intake port 3, a blower fan 4, a blower fan motor 5, an intake door 6, a cleaning unit case 7, an evaporator 8, a heater unit case 9, a vent blow-off port 10, a defroster blow-off port 11, a foot blow-off port 12, a heater core 13, a mix door 15, a vent door 16, a defroster door 17, and a foot door 18.

And, in the present air conditioning system, as a control system, as shown in the middle portion of FIG. 2 to the lower portion thereof, there are provided a fan control circuit 20, an intake door actuator 22, an air mix door actuator 23, a mode door actuator 24, an air conditioning amplifier unit 25, a water temperature sensor 26, a refrigerant temperature sensor 27, an indoor air sensor 28, an open air sensor 29, a sunlight sensor 30, an intake temperature sensor 31, and a controller 32.

The fan control circuit 20 controls a voltage to be applied to the blower fan motor 5 in a step-less manner in accordance with an instruction from the air conditioning amplifier unit 25.

The intake door actuator 22 is an actuator which, if the door opening angle (for an indoor air, a semi-open-air, and an open air) of the intake door 6 is decided by the air conditioning amplifier unit 25, moves the intake door 6 to the thus decided door opening angle.

The air mix door actuator 23 is an actuator which, if a virtual door opening angle XPBR is decided by the motor air conditioning amplifier unit 25, receives data on the thus decided virtual door opening angle XPBR and operates the mix door 15 in such a manner that a door opening angle coincident with the present virtual door opening angle XPBR can be obtained.

The mode door actuator 24 is an actuator which, if a target mode door position is decided by the air conditioning amplifier unit 25, opens and closes a mode door (a generic name for the vent door 16, the defroster door 17, and the foot door 18).

The air conditioning amplifier unit 25 operates and processes input signals from switches, sensors or the like according to a software program by means of a built-in microcomputer, and controls the blower fan motor 5, the respective door actuators 22, 23, 24, a compressor (not shown) and the like synthetically.

The water temperature sensor 26 detects the temperature of engine cooling water, the refrigerant temperature sensor 27 detects the temperature of a refrigerant, the indoor air sensor 28 detects an indoor air temperature TINC, the open air sensor 29 detects an open air temperature Tam, the sunlight sensor 30 detects a sunlight amount QSUN, and the intake temperature sensor 31 detects the intake temperature TINT, respectively, while they respectively input the detected temperatures into the air conditioning amplifier unit 25.

The controller 32, which is disposed in the control panel section of the interior portion of a vehicle, includes a display part 32a for displaying the mode, fan speed, temperatures and the like, an operation part 32b in which mode switches, temperature adjusting dials and the like are mounted, and an operation/display/communication circuit 32c which outputs display data to the display part 32a, inputs switch data from the operation part 32b, and transmits and receives data to and from the air conditioning amplifier unit 25. The operation/display/communication circuit 32c is connected to the air conditioning amplifier unit 25 by an operation data line 33, a clock signal line 34 and a display communication data line 35.

Figure 3:
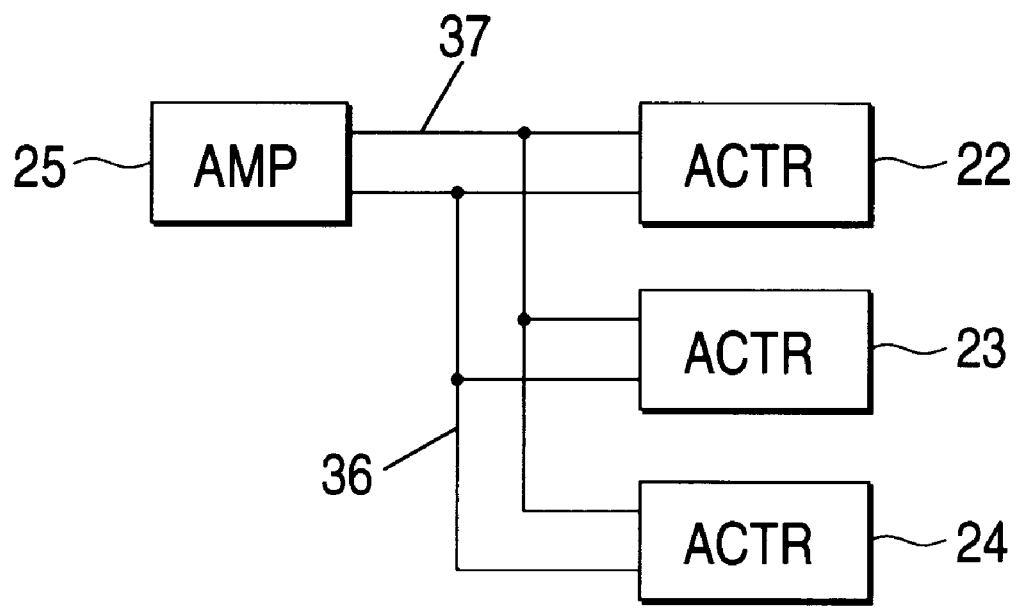
FIG. 3 is a block diagram of a network between the amplifier and actuators according to the embodiment.

Now, FIG. 3 is a view of a network between the amplifier and actuators. As, shown in FIG. 3, the air conditioning amplifier unit 25 is connected to the respective door actuators 22, 23 and 24 through a single communication line 36 and a single power source line 37. And, the air conditioning amplifier unit 25 transmits one of the addresses of the respective door actuators 22, 23 and 24 and the target position data of the motor, while an actuator having the corresponding address receives the data and rotates the motor to the target position.

Figure 4:
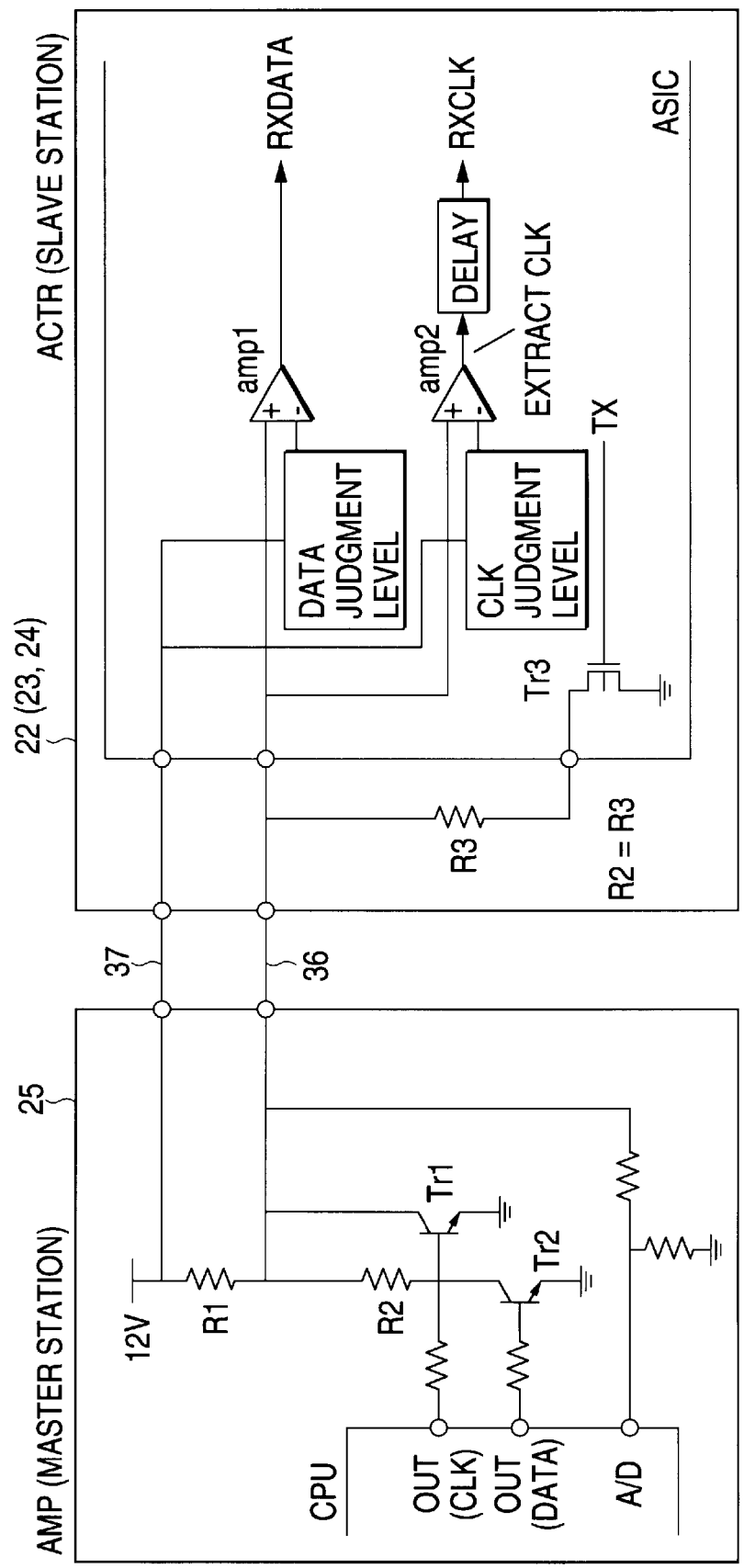
FIG. 4 is a view of a physical layer according to the embodiment 1 with a protection circuit between the amplifier and actuators omitted therefrom.

Now, FIG. 4 is a view of a physical layer (a layer having a function to establish the electric connection of wires in the network, a function to maintain such electric connection, and a function to remove such electric connection) with a protection circuit between amplifier and actuators omitted therefrom. In this physical layer, as a communication signal, there is used a ternary code which includes a clock signal and data superimposed on the clock signal, while the ternary code expresses two kinds of pulse amplitudes H and L. ASIC of the actuator extracts a clock from the communication signal, while the logic circuit of ASIC, in accordance with the thus extracted clock, decodes the communication signal (an operation to decode encoded data) and executes all other operations. Since the clock signal is supplied only from the amplifier, the communication speed can be set arbitrarily by the software of the amplifier.

Figure 5:
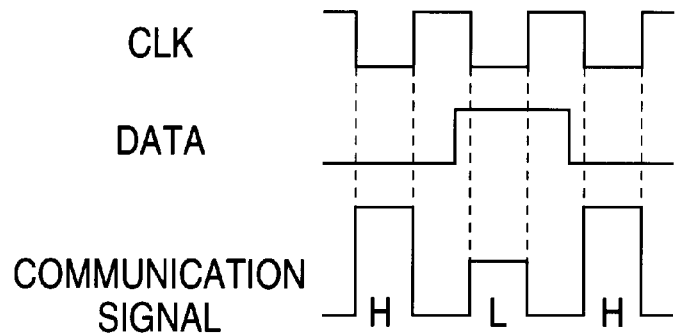
FIG. 5 (a) is a transmission timing chart for a transmission operation to be performed by the amplifier, and FIG. 5 (b) is a receive timing chart for a receive operation to be performed by the actuators.
Figure 5:
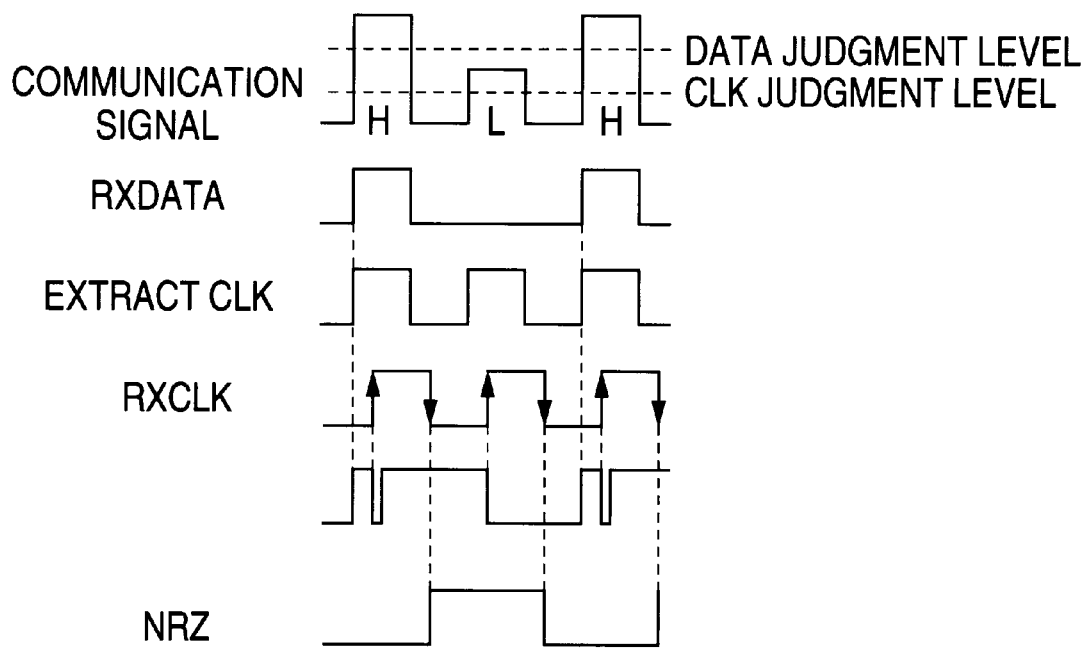

Now, FIG. 5 (a) is a transmission timing chart to show the transmission operation of the amplifier. Here, when a CLK output (a clock output) is H, then the communication line 36 is grounded by a transistor Tr1 regardless of a DATA output (data output). Also, when the CLK output is L, then the communication line 36 is set at 12 V or at an intermediate potential, which can be decided by resistors R1 and R2, by turning on/off a transistor Tr2 in response to the DATA output.

And, FIG. 5 (b) is a receive timing chart to show the receive operation of the actuators, in which a comparator cmp1 for data extraction has a judging level larger than an L pulse amplitude and a comparator cmp 2 for clock extraction has a judging level smaller than the L pulse amplitude. A signal, which is set in RXDATA and reset in the rising of RXCLK, is sampled in the falling of RXCLK, so that the signal can be decoded. In FIG. 5 (b), reference character NRZ designates extraction data.

Next, description will be given below of the operation of the embodiment. [Communication Procedure]

Now, description will be given below of the communication procedure with reference to FIGS. 6 to 9.

A signal used in communication, as shown by a communication waveform in FIG. 6 (a), defines H and L by means of two kinds of pulse amplitudes. And, as shown by an encoded table in FIG. 6 (b), a combination of three pulses is used to express 2-bit binary data.

Figure 8:
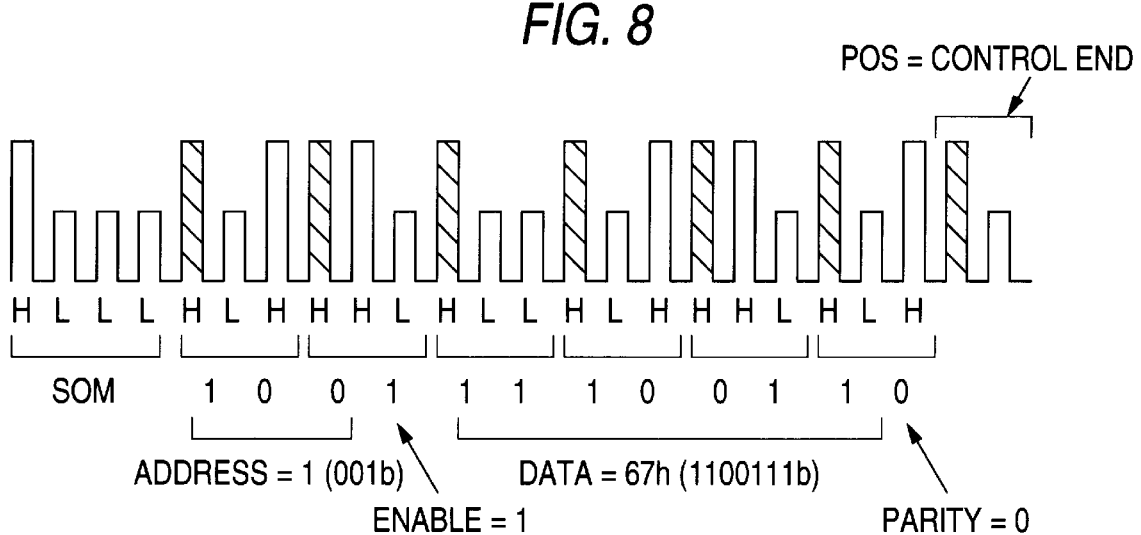
FIG. 8 is a view of an actual example of the communication format.

A communication format, as shown in FIG. 7, includes SOM (Start Of Message) representing the start of the transmission, ADR (Address) representing the address of an actuator to which the communication signal is transmitted, ENA (Enable) representing the permission or prohibition of driving of the motor, DATA (Data) representing the target stop position of a door, PRTY (Odd Parity) for checking the errors of ADR, ENA, and DATA, and POS representing a diagnostic actuator return signal. Also, FIG. 8 shows an actual example of the communication format, in which the oblique line portions always provide H pulses.

Referring now to a receive sequence, on receiving SOM representing the start of the communication format, ASIC starts the receive sequence. And, ASIC inputs the following data only when it detects the corresponding address but, when it detects any strange waveform combination not found in the encoded table or any abnormal parity, ASIC terminates the receive sequence and relinquishes the data received. If SOM is received during the receive sequence, the receive sequence must be started again from scratch. Only when ENA is 1, ASIC drives the motor and, when ENA is 0, ASIC simply updates the data but does not drive the motor.

Now, referring to the response signal of the actuator, the amplifier always turns off the transistor Tr2 in the POS signal portion, while both of two pulses representing the POS signal are normally H pulses. If the position of the door reaches the target position and the door control is ended, then the actuator, which has received a signal from the amplifier, turns on the transistor Tr3 at such a timing that the second pulse of the POS signal provides an L pulse. By monitoring the amplitude of the POS signal, the amplifier can judge whether the door of the actuator to which the signal is to be transmitted is present at the target position or not. The response of the actuator is executed only when the normal receiving operation is completed, but it is not executed when the address is not coincident or when an error occurs. By the way, FIG. 9 (a) shows the state of the POS signal obtained when the door control is under way, whereas FIG. 9 (b) shows the state of the POS signal obtained when the door control is ended. [Fan Motor Maximum Voltage Limit Control]

Now, FIG. 10 is a flow chart which shows the flow of a fan motor maximum voltage limit control operation to be executed by the air conditioning amplifier unit 25. From now on, description will be given of the respective steps of the present control operation.

In Step 50, it is checked whether a FAN voltage limit flag is "0" showing a maximum voltage non-limit time or "1" showing a maximum voltage limit time.

In Step 51, if the FAN voltage limit flag =0, then it is checked whether the mode actuator 24 is in operation or not.

This check is executed in accordance with the judgment that the transmission target shown by ADR (address) out of the signal transmitted from the air conditioning amplifier unit 25 is the mode door actuator 24, ENA is "1" showing the permission of the motor drive, and DATA (data) shows that the data on the door target stop position transmitted last time is different from the data on the door target stop position transmitted this time.

In step 52, if the FAN voltage limit flag =0 and NO is judged in Step 51, then it is checked whether the air mix door actuator 23 is being operated by a given opening angle from the full hot side thereof toward the full cool side thereof or not.

This check is executed in accordance with the judgment that the transmission target shown by ADR (address) out of the signal transmitted from the air conditioning amplifier unit 25 is the air mix door actuator 23, ENA is "1" showing the permission of the motor drive, and DATA (data) shows that the data on the door target stop position transmitted last time is different from the data on the door target stop position transmitted this time.

In Step 53, if it is judged in Step 51 that the mode door actuator 24 is in operation, or if it is judged in Step 52 that the air mix door actuator 23 is in operation on the full hot side thereof, then there is started a fan motor output voltage limit in which, even if a target voltage obtained by an operational processing is equal to or higher than 8.5 V, the maximum value of an output voltage to be applied to the fan motor 5 is limited to a value equal to or less than 8.5 V.

In Step 54, the FAN voltage limit flag is rewritten from "0" to "1".

In Step 55, if it is judged in step 50 that the FAN voltage limit flag =1, then it is checked whether the POS signal serving as the diagnostic actuator response signal is low or not.

Figure 9:
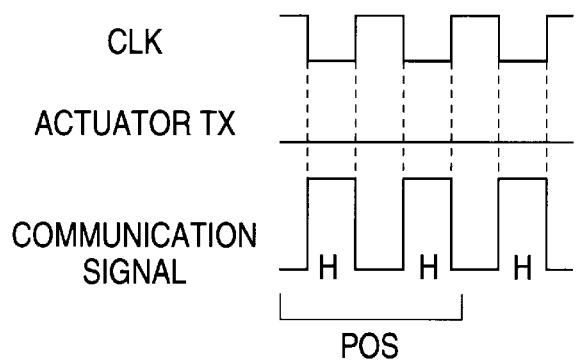
FIG. 9 (a) is a view of a POS signal indicating that the control is under way, and FIG. 9 (b) is a view of a POS signal indicating that the control is ended.
Figure 9:
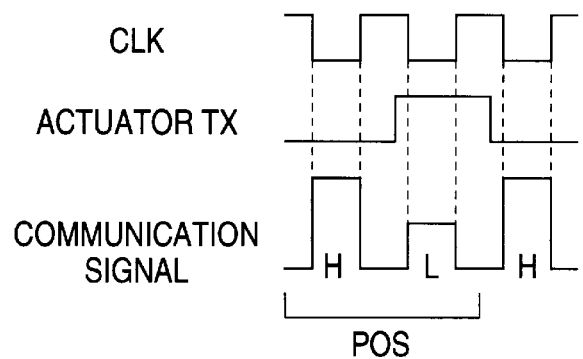

This check is executed by monitoring the amplitude of the signal sent back to the air conditioning amplifier unit 25 and by checking whether the under-control signal having a high and high waveform shown in FIG. 9 (a) has been switched over to the control end signal having a high and low waveform shown in FIG. 9 (b) or not.

In Step 56, if the POS signal becomes low, the door position reaches the target position and the door control is ended in Step 55, then there is removed the fan motor output voltage limit in which the maximum value of an output voltage to be applied to the fan motor 5 is limited to a value equal to or less than 8.5 V.

In Step 57, the FAN voltage limit flag is rewritten from "1" to "0". [Fan Motor Maximum Voltage Limit Operation]

During the mode door operation in which three kinds of doors 16, 17 and 18 are operated and thus the load of the fan motor 5 is large, or during the full hot side operation of the air mix door 15 in which an air feed resistance is produced to thereby increase the load of the fan motor 5, the processing advances from Step 50 to Step 51 or from Step 52 to Step 53 in FIG. 10 and, in Step 53, even if the target voltage is equal to or higher than 8.5 V, the maximum value of the output voltage to be applied to the fan motor 5 is limited to 8.5 V or less.

In other words, since the maximum value of the output voltage to be applied to the fan motor 5 operating simultaneously with the doors is limited in this manner, there can be secured a motor drive torque which is necessary to operate the doors, which in turn makes it possible to control or open and close the doors with proper response.

And, when the door position reaches the target position and the door control is ended, in FIG. 10, the processing advances in the order of Step 50, Step 55 and Step 56 and, in Step 56, there is removed the fan motor output voltage limit which limits the maximum value of the output voltage to be applied to the fan motor 5 is limited to 8.5 V or less.

Therefore, except for a specific door operation such as the mode door operation or the like, there is removed the maximum value limit of the output voltage to be applied to the fan motor 5 and thus the fan motor 5 can be driven with an output voltage which is coincident with the target voltage, thereby being able to achieve an optimum airflow control and the like.

In other words, in an embodiment employing the LAN system between the amplifier and actuators, when only the transmission signal is sent from the amplifier to the actuators through a single communication line, it is impossible to judge that the door position of the mode door or the like reaches the target position and thus the door control is ended. In this state, if the maximum value of the output voltage to be applied to the fan motor 5 is limited to 8.5 V or less, then the 8.5 V limit remains left as it is all the time after then, which makes it inevitable to relinquish the 8.5 V limit.

In contrast with the above, according to the invention, there is set a response signal which is sent from the actuator side to the amplifier side telling to the effect that the control is under way or the control is ended, so that, if the response signal provides a signal which indicates that the control is ended, then the 8.5 V limit can be removed. Thanks to this, in spite of the employment of the LAN system between the amplifier and actuators, there is eliminated the need to relinquish the 8.5 V limit, that is, the 8.5 V limit can be used effectively.

Next, description will be given below of the effects of the invention.

As described above, the present air conditioning control apparatus is structured such that the air conditioning amplifier unit 25 is connected to the plurality of door actuators 22, 23 and 24 through the single communication line 36 and the single power source line 37; the communication signal to be sent through the single communication line 36 is set as a two-way signal comprising a transmission signal which contains the data on the door target stop position and is to be transmitted to the door actuators 22, 23 and 24, and a response signal to be sent back from the door actuators 22, 23 and 24; and, when the door target stop position data sent last time is different from the door target stop position data sent this time, the maximum voltage limit of the fan motor 5 is put into operation and, on the other hand, the POS signal to be sent back from the door actuators 22, 23 and 24 to the air conditioning amplifier unit 25 provides the control end signal indicating that the door position reaches the target position and thus the door control is ended, the operation of the maximum voltage limit of the fan motor 5 is removed. Thanks to this structure, the present air conditioning control apparatus not only can reduce the weight and cost of the system by use of the LAN system between the amplifier and actuators but also can secure the door drive torque during the door operation by means of the maximum voltage limit of the fan motor 5.

Since the present air conditioning control apparatus is structured such that, in the fan motor maximum voltage limit control, it limits the fan motor voltage to the maximum voltage value (8.5 V) during the operation of the mode door, namely, doors 16, 17, 18 or during the full hot side operation of the air mix door 15, the present apparatus can exert the maximum voltage limit only during a specific door operation which is larger in the drive load than other door operations and, in the other door operations, can secure the drive control of the fan motor 5 in which the maximum voltage limit is not exerted.

As the communication signal to be sent through the single communication line 36, there is employed a ternary code which includes a clock signal to be supplied from the air conditioning amplifier unit 25 and data superimposed on the clock signal, two kinds of pulse amplitudes are used to express high and low waveforms respectively, the final portion of the transmission signal is used in the form a POS signal which is a response signal from the door actuators 22, 23 and 24, the POS signal is set such that two pulses are both high when the door control is under way, whereas the second pulse is low when the door control is ended. Due to this arrangement, by a simple processing to monitor the pulse amplitudes of the POS signal, there can be obtained the control end information which is the condition to remove the maximum voltage control.

In the aforementioned embodiment, there is shown an example in which there are provided three door actuators 22, 23 and 24. However, the present invention can also be applied to a system in which there are provided three or more door actuators with a bypass door and the like added.

Also, in the aforementioned embodiment, during the operation of the mode door or during the operation of the full hot side of the air mix door, the fan motor voltage is limited to the maximum voltage value. However, it should be noted here that the invention also includes another embodiment in which the fan motor maximum voltage limit can be executed by other conditions than the conditions specified in the embodiment 1.

Further, in the aforementioned embodiment, as the signal to be sent back from the door actuators to the amplifier, there is used the POS signal comprising two pulse signals. However, the signal to be sent back from the door actuators to the amplifier is not limited to the POS signal but other signals can also be used, provided that they can indicate that the door position reaches the target position and the door control is ended.

According to the present invention, there is provided an air conditioning control apparatus of a type that it drives and controls a fan motor and a plurality of door actuators, in an air conditioning system for use in a vehicle, wherein the air conditioning amplifier unit is connected to the plurality of door actuators through a single communication line and a single power source line, and a fan motor maximum voltage limit control means not only can create a communication signal to be transmitted through the single communication line in the form of two-way signals including a transmission signal containing door target stop position data to be transmitted to the door actuators and a response signal from the door actuators but also, when the door target stop position data transmitted last time is different from the door target stop position data transmitted this time, can exert a fan motor maximum voltage limit, and, when the signal to be sent back from the door actuators to the air conditioning amplifier unit is a control end signal which indicates that the door position reaches the target position and the door control is ended, can remove the operation of the fan motor maximum voltage limit. Thanks to this structure, with use of the present apparatus, there can be provided an effect that not only the system can be reduced in weight and cost through employment of an LAN system between the amplifier and actuators but also a door drive torque can be secured during the door operation by exertion of the fan motor maximum voltage limit.

Further, in the aforementioned air conditioning control apparatus, the fan motor maximum voltage limit control means is arranged as means which can limit the fan motor voltage to the maximum voltage value during the operation of the mode door or during the operation of the full hot side of the air mix door. Due to this, according to the present invention, in addition to the effect obtained in the aforementioned invention, the maximum voltage limit can be exerted only during a specific door operation which is larger in the drive load than other door operations, and, in the other door operations, there can be secured a fan motor drive control in which no limit is set on the maximum voltage of the fan motor.

Still further, in air conditioning control apparatus, as the communication signal to be transmitted through the single communication line, there is used a ternary code including a clock signal supplied from the air conditioning amplifier unit and data superimposed on the clock signal, two kinds of pulse amplitudes are used to express high and low waveforms respectively, the final portion of the transmission signal is used in the form of a response signal to be sent back from the door actuators, and the response signal is structured such that two pulses are both high when the door control is under way, whereas the second pulse is low when the door control is ended. Thanks to this arrangement, in addition to the effects provided by the aforementioned invention, by a simple processing to monitor the pulse amplitudes of the response signal, there can be obtained the control end information which is the condition to remove the fan motor maximum voltage limit.

What is claimed is:

1. An air conditioning control apparatus in an air conditioning system for use in a vehicle, comprising:

a fan motor for driving a fan;

a plurality of door actuators operating a plurality of doors so that the doors open at a target door opening angle;

an air conditioning amplifier unit for processing input signals from outer equipments provided in the vehicle in accordance with programs contained therein so as to control the door actuators and the fan motor, wherein the air conditioning amplifier unit is connected to the plurality of door actuators through a single communication line and a single power source line, and a communication signal to be transmitted through the single communication line is two-way signals including a transmission signal containing door target stop position data to be transmitted to the door actuators and a response signal to be sent back from the door actuators; and fan motor maximum voltage limit control means for limiting a fan motor voltage to a maximum voltage value when a target voltage of the fan motor becomes equal to or higher than the maximum voltage value during the operation of the doors;

wherein the fan motor maximum voltage limit control means performs the following two modes:

(i) when the door target stop position data transmitted last time is different from door target stop position data transmitted this time, limits the fan motor voltage to the maximum voltage value, and (ii) when the response signal is a control end signal which indicates that a door position reaches a target position and door control is ended, remove to limit the fan motor voltage to the maximum voltage value.

2. The air conditioning control apparatus according to claim 1, wherein the fan motor maximum voltage control means limits the fan motor voltage to the maximum voltage value during an operation of a mode door or during an operation of a full hot side of an air mix door of the doors.

3. The air conditioning control apparatus according to claim 1, wherein the communication signal comprises a ternary code including a clock signal supplied from the air conditioning amplifier unit and data superimposed on the clock signal, two kinds of pulse amplitudes are used to express high and low states respectively, a final portion of the transmission signal is used as the response signal to be sent back from the door actuators, and the response signal is structured such that two pulses are both high when the door control is under way, whereas a second one of the two pulses is low when the door control is ended.

4. The air conditioning control apparatus according to claim 2, wherein the communication signal comprises a ternary code including a clock signal supplied from the air conditioning amplifier unit and data superimposed on the clock signal, two kinds of pulse amplitudes are used to express high and low states respectively, a final portion of the transmission signal is used as the response signal to be sent back from the door actuators, and the response signal is structured such that two pulses are both high when the door control is under way, whereas a second one of the two pulses is low when the door control is ended.

* * * * *